United States Patent Office 2,876,217
Patented Mar. 3, 1959

2,876,217

STARCH ETHERS CONTAINING NITROGEN AND PROCESS FOR MAKING THE SAME

Eugene F. Paschall, Orland Park, Ill., assignor to Corn Products Company, a corporation of New Jersey No Drawing. Application December 31, 1956
Serial No. 631,429

12 Claims. (Cl. 260—233.3)

This invention relates to the preparation of starch ethers containing quaternary ammonium substituents. More particularly this invention relates to the preparation of gelatinizable quaternary ammonium starch ethers by a process in which the starch is retained in the granule form during the etherification reaction and in which cross-linking is avoided or kept at a minimum.

I have discovered that nitrogenous products of this nature may be prepared by reacting starch with the reaction product of epihalohydrin and a tertiary amine or a tertiary amine salt (e. g., a salt such as is obtained by treating a tertiary amine with hydrochloric or sulfuric acid). Tertiary amines suitable for my invention may be represented by the formula $$R_1-N-R_2$$
$$|$$
$$R_3$$

wherein $R_1$, $R_2$ and $R_3$ are from the group consisting of alkyl, substituted alkyl, alkene, aryl, and aralkyl, but if all three of $R_1$, $R_2$ and $R_3$ are the same, they each should contain not more than 4 carbon atoms. If all three $R_1$, $R_2$ and $R_3$ are not the same and if $R_3$ contains up to 18 carbon atoms, then $R_1$ and $R_2$ should preferably be from the group consisting of methyl and ethyl, and if $R_1$ and $R_2$ are joined to form a ring, then $R_3$ should preferably be from the group consisting of methyl and ethyl.

The reaction between epihalohydrin and the amine or the amine salt results in compounds which may be represented by the formula $$R_4-\overset{+}{N}\overset{R_1}{\underset{R_3}{-R_2}}$$

wherein $R_4$ is 2,3-epoxypropyl if the free amine is used, and $R_4$ is 3 halo 2 hydroxypropyl if a salt of the tertiary amine is employed.

The reaction between the epihalohydrin and amine may be shown by the following equations, using trimethylamine and trimethylamine hydrochloride and epichlorohydrin for illustrative purposes.

(1)
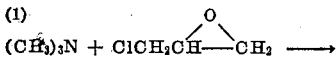
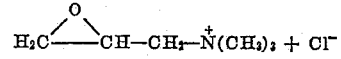

(2)
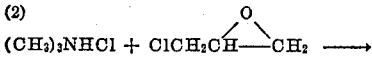
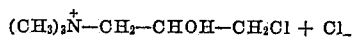

These products will be referred to hereinafter for the sake of simplicity as epihalohydrin reaction products. They react with starch in the presence of strongly alkaline catalysts to give the aforementioned products provided the epihalohydrin reaction products are purified to remove substantially all of the unreacted epihalohydrin and further provided the reaction is carried out under controlled conditions.

It is well known in the art that epihalohydrins, even in small amounts, will react with granular starch under strongly alkaline pH conditions to form cross-linked starch ethers which are nongelatinizable in boiling water. I have found it impossible to control the reaction of epihalohydrin with any tertiary amine in such a manner that a substantially epichlorohydrin free reaction product is formed. That is, sufficient epihalohydrin always remains so that a nongelatinizable (cross-linked) product results when the addition product is allowed to react with starch in the presence of strongly alkaline catalyst. I have discovered, however, that by subjecting the amine epichlorohydrin reaction mixture to vacuum evaporation or solvent extraction, detrimental amounts of epihalohydrin can be removed therefrom so that cross-linking does not occur to any substantial extent when the reagent is allowed to react with starch and an easily gelatinizable quaternary ammonium starch derivative may be prepared.

The reaction of starch and the epihalohydrin reaction product may be illustrated by the following equations wherein the reaction product of trimethylamine and epichlorohydrin is representative:

(3) 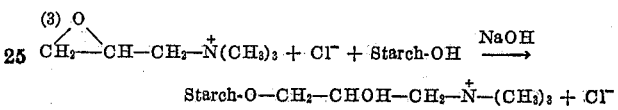

As tertiary amines, I prefer to use those possessing at least two methyl groups attached directly to the nitrogen because of their superior reactivity to epihalohydrin to form the desired reagent. This reactivity is retained even when the third group of tertiary amine contains as many as 18 carbon atoms, such as is found in dimethylstearyl amine. This high reactivity is believed to result from the low order of stearic hindrance imparted by the two methyl groups, allowing for intimate contact of epihalohydrin with the free electron pair of the tertiary amino nitrogen. By way of example, the following dimethyl tertiary amines may be mentioned as particularly suitable for carrying out this invention; trimethyl, dimethylbenzyl, dimethyldodecyl, and dimethylstearyl amines. However, other tertiary amines such as triethylamine, N-ethyl and N-methyl morpholine, N-ethyl and N-methyl piperidine and methyl diallylamine may also be used.

In carrying out the process of my invention, the previously described reagents may be prepared by simply mixing equimolar quantities of epihalohydrin and the tertiary amine or tertiary amino salt in an aqueous system allowing the reaction to proceed preferably with agitation until the formation of the reagent is complete. When employing a tertiary amine salt in the reagent preparation, the pH of the aqueous solution should be at least 5 and preferably between 6 and 8. The resultant addition product may be purified as desired by solvent extraction or vacuum distillation to remove unreacted epihalohydrin and amine. More details as to preparation and purification of the reagent are set forth in the examples which follow.

In order to prepare the starch derivatives of this invention, an epihalohydrin reaction product is dissolved in a suitable solvent, e. g., water, dioxane, isopropyl alcohol, and then the starch added thereto. A strongly alkaline catalyst is added to the mixture to promote the reaction. The reaction is generally spontaneous, i. e., occurs at room temperature; however, heat and increased amounts of catalyst increase the reaction rate. In order that the starch ether be obtained in substantially unswollen granule form, substantially unswollen starch is employed and the temperature and alkali concentration are maintained low enough to avoid gelatinization during derivatization. Salts, such as sodium carbonate or sodium sulfate, may be added to raise the gelatinization temperature of the starch. Sodium sulfate, for example, also increases the reaction rate. If an aqueous medium has been used, the catalyst may be removed by neutralization followed by filtration and, if desired, the remaining salts removed by aqueous or an aqueous-organic solvent washing.

A wide variety of strongly alkaline compounds may be used as catalysts in my invention. These include the alkali metal hydroxides, alkaline earth oxides and hydroxides and quaternary ammonium bases. The amount of etherification catalyst which gives satisfactory results in producing a starch ether in granule form may be 0.01 to 0.2 mole of catalyst per molar weight of anhydroglucose residue but 0.05–0.1 mole is preferred. Salts used to prevent swelling of the starch granules, e. g., $Na_2SO_4$, $Na_2CO_3$, $MgSO_4$ may be added in concentrations ranging up to that required to saturate the solution. When such saturated salt solutions are used as the reaction medium for the etherification, concentrations of alkali catalyst as high as 0.2 mole may be employed without gelatinizing the starch granules. As previously mentioned, sodium sulfate also increases the reaction rate. Any temperature below the gelatinizing temperature of starch may be employed for preparing my starch ethers in unswollen granule form.

My invention is applicable to all granular starches but is described with particular reference to corn starch. It is applicable to corn, potato, tapioca, sago, rice, wheat, waxy maize, grain sorghum starches in raw or modified forms, e. g., modified with acid, oxidizing agents and the like as long as the starch retains its unswollen granule form.

The starch derivatives which may be prepared by means of the present invention are neutral quaternary ammonium salts. A full positive charge is retained by the starch derivatives at all pH values whereas the basic amino starch products of the prior art are so charged only in an acid medium. My new cationic starches have other unique properties which make them suitable for a variety of uses. They gelatinize in hot water to form clear viscous pastes which do not set back on standing. They are useful as flocculating agents for anionic colloids, suspending agents, sizing agents, emulsifying agents, and the like. They may be gelatinized and dried as on heated rolls, in conventional manner, to make them water soluble.

The invention will be further illustrated by examples which are intended as typical and informative only and in no way limiting the invention.

*Example 1*

This example illustrates the preparation of a starch ether in granular form from the epichlorohydrin-triethylamine reaction product.

0.2 mole (20.2 g.) of triethylamine and 0.2 mole (18.5 g.) of epichlorohydrin were mixed with 100 ml. of water and the mixture was agitated for 5 hours at room temperature. Following this, the solution was concentrated to a thick syrup by vacuum distillation at 30° C. and 10–30 mm. pressure, collecting volatiles in a Dry Ice trap. A slurry containing one mole (162 g. dry basis) of unmodified corn starch, 250 ml. of water, 0.17 mole (10 g.) of NaCl and 0.07 mole (2.8 g.) of NaOH was added to the flask containing the syrup and the mixture stirred for 17 hours at 40° C. The reaction mixture was neutralized to pH 7 with HCl, the resulting cationic starch ether filtered and the filter cake washed with water. The degree of substitution of the starch ether was 0.065. When cooked in water it had greatly increased water absorption capacity and increased paste clarity and stability over untreated starch.

*Example 2*

This example illustrates the preparation of a quaternary ammonium ether of an acid modified starch (60 fluidity) in granular form from epichlorohydrin-triethylamine reaction product.

The epichlorohydrin-triethylamine reaction product was prepared as described in Example 1. A slurry containing one mole (162 g.) of 60 fluidity corn starch, 250 ml. of water, 0.17 mole (10 g.) NaCl and 0.06 mole (2.4 g.) of NaOH was added to the derivatizing agent and the mixture stirred for 20 hours at 40° C. under vacuum. The reaction mixture was neutralized with HCl, the starch product filtered and the filter cake washed with water. The product when cooked in water forms a long paste with increased water absorption capacity and increased paste clarity and stability as compared to untreated starch. The degree of substitution of the ether was 0.061.

*Example 3*

When epibromohydrin was substituted for epichlorohydrin in Example 2 a similar product was obtained.

*Example 4*

This example illustrates the preparation of a quaternary ammonium starch ether in granular form from epichlorohydrin-trimethylamine reaction product.

0.2 mole (49 g. of 25 percent aqueous solution) of trimethylamine and 0.2 mole (18.5 g.) of epichlorohydrin were mixed with 50 ml. of water and the mixture agitated for 3 hours at room temperature. The resulting solution was concentrated to a thick syrup by vacuum distillation at 30° C. and 10–30 mm. pressure, collecting volatiles in a Dry Ice trap. This derivatizing agent was reacted with unmodified corn starch under the same reaction conditions as given in Example 1. The product exhibited the same improvement in pasting characteristics as described in Example 1. The degree of substitution of the ether was 0.05.

*Example 5*

This example illustrates the preparation of a granular quaternary ammonium starch ether from the epichlorohydrin-dimethylbenzylamine reaction product.

0.2 mole (27 g.) of dimethylbenzylamine and 0.2 mole (18.5 g.) of epichlorohydrin were mixed in water and stirred overnight. A slurry containing one mole (162 g. dry basis) of unmodified corn starch, 310 ml. of water, 0.17 mole (10 g.) of NaCl and 0.06 mole (30 ml. of 2 N NaOH) was added to a flask containing the purified derivatizing agent and the mixture stirred for 22 hours at 40° C. The pH of the mixture was adjusted to 7 with HCl, the mixture filtered and the starch ether washed with water. The starch ether formed a heavy, viscous paste when cooked with water. This paste formed emulsions with hydrocarbons, such as benzene and hexane, which were stable for a period of 3 weeks. The degree of substitution of the ether was 0.05.

*Example 6*

This example illustrates the preparation of a granular quaternary ammonium starch ether from the epichlorohydrin-dimethyldodecylamine reaction product. The reaction was carried out as in Example 5 except that the reaction time was 18 hours at 40° C. The resultant starch ether had properties similar to that of Example 5. The degree of substitution of the ether was 0.058.

*Example 7*

This example illustrates the preparation of a granular starch ether from the epichlorohydrin-dimethylaniline reaction product.

0.2 mole of dimethylaniline and 0.2 mole of epichlorohydrin in 100 ml. of water were stirred 43 hours at 34° C. The solution was vacuum distilled at 30° C. until a heavy viscous syrup was formed.

A slurry consisting of 1 mole of starch (180 g. at 12 percent moisture), 0.14 mole $Na_2SO_4$ and 0.08 mole of NaOH in 260 ml. of water was mixed with the purified reagent and the suspension stirred 20 hours at 45° C. The reaction mixture was neutralized to pH 7.0 with HCl, filtered, and the filter cake washed first with 500 ml. of water and then with 300 ml. of methanol. The degree of substitution of the product was 0.041.

Example 8

This example illustrates the preparation of a granular starch ether from the epichlorohydrin-N-ethylpiperidine reaction product.

A solution consisting of 0.1 mole of N-ethylpiperidine and 0.1 mole of epichlorohydrin in 150 ml. of water was stirred 4 hours at 46° C. and the solution allowed to stand overnight at room temperature in the presence of an additional 0.05 mole of epichlorohydrin. The solution was then vacuum distilled at 40° C. to a thick syrup.

A slurry consisting of 1 mole (180 g. at 12 percent of moisture) of starch, 0.15 mole $Na_2SO_4$ and 0.07 mole of NaOH in 270 ml. of water was stirred with the purified reagent for 16 hours at 46° C. The reaction mixture was neutralized to pH 7.0 with 0.06 mole HCl, filtered, and the filter cake washed with water. The product had a D. S. of 0.024 and gelatinized in water to form a clear, viscous and stable paste.

Example 9

This example illustrates the preparation of a granular starch ether from the epichlorohydrin-N-ethylmorpholine reaction product.

0.1 mole of N-ethylmorpholine and 0.12 mole of epichlorohydrin were mixed with 150 ml. of water and the solution stirred 4 hours at 40° C. The solution was then treated with an additional 0.07 mole of epichlorohydrin and allowed to stand 48 hours. Following this, the solution was vacuum distilled to a thick syrup.

A slurry consisting of 1 mole of starch (180 g. at 12 percent moisture), 0.06 mole NaOH and 0.10 mole of $Na_2SO_4$ in 260 ml. of water was added to the purified reagent and the suspension stirred 16 hours at 46° C. The reaction mixture was neutralized to pH 7 with HCl, filtered and the filter cake washed with water. The air-dried product contained 0.458 percent nitrogen, equivalent to a degree of substitution of 0.057.

Example 10

This example illustrates the preparation of a granular starch ether from the epichlorohydrin-N-methyldiallylamine reaction product.

A mixture consisting of 0.1 mole of N-methyldiallylamine, 0.1 mole of epichlorohydrin and 100 ml. of water was stirred 6 hours at 40° C. The solution was vacuum distilled to a thick syrup at 35° C.

A mixture consisting of 1 mole of starch (180 g. at 12 percent moisture), 0.14 mole $Na_2SO_4$, and 0.06 mole of NaOH in 250 ml. of water was added to the purified reagent. The slurry was then stirred 18 hours at 40° C. in a constant temperature bath. The reaction mixture was neutralized to pH 7.0 with 0.055 mole of HCl, filtered and the filter cake washed first with water followed with methanol. The air-dried product possessed a degree of substitution of 0.013.

Example 11

This example illustrates the preparation of a granular quaternary ammonium starch ether from the trimethylamine hydrochloride reaction product.

A 30 percent aqueous solution of trimethylamine was added to 0.1 mole of N HCl in 100 ml. of water until the pH was 8.5. Epichlorohydrin (0.1 mole) was added and the mixture stirred at 30° C. for one hour. The aqueous solution was vacuum distilled to a solid white residue consisting of 3-chloro, 2-hydroxypropyl trimethylammonium chloride. The chlorohydrin was cyclized to the epoxide with 0.1 mole of NaOH in 100 ml. of water.

A mixture consisting of 1 mole of starch, 0.14 mole of $Na_2SO_4$ and 0.06 mole of NaOH in 250 ml. of water was added to the purified reagent. The slurry was then stirred 18 hours at 40° C. The reaction mixture was neutralized to pH 7.0 with HCl, filtered and the filter cake washed with water. The air-dried product contained 0.41 percent nitrogen, equivalent to a degree of substitution of 0.05.

Example 12

This example illustrates the preparation of a granular starch ether from the epichlorohydrin-2-chloro-N, N-dimethylethylamine reaction product.

0.1 mole of 2-chloro-N, N-dimethylethylamine hydrochloride was dispersed in 100 ml. of water. Sufficient NaOH was added to raise the pH from 3.5 to 7.9. so that the solution contained both the free amine and tthe amine salt in equilibrium. 0.1 mole of epichlorohydrin was added and the solution stirred 2 hours at room temperature. The chlorohydrin group was then cyclized to the epoxide by addition of 0.07 mole of NaOH. After stirring the alkaline solution for 30 minutes at room temperature, the volatiles were removed by vacuum distillation.

A slurry consisting of 1 mole of starch (180 g. at 12 percent moisture), 0.14 mole of $Na_2SO_4$ and 0.08 mole of NaOH in 190 ml. of water was mixed with the purified reagent and the suspension stirred 16 hours at 40° C. The reaction mixture was neutralized to pH 7.0 with HCl, filtered and the filter cake washed with water. The chloride ion of the derivative was replaced with sulfate by washing the filter cake with 1 liter of N $Na_2SO_4$. Residual sulfate ion was then removed by washing the filter cake with water. The air-dried product contained 0.48 percent organic bound chlorine and 0.32 percent nitrogen. Based on nitrogen content, the degree of substitution of the product was 0.038.

Example 13

This example illustrates the preparation of a granular starch ether from the epichlorohydrin-dimethylstearylamine reaction product.

A mixture consisting of 0.2 mole of dimethylstearylamine (sold under the trademark Armeen DM 18), 0.2 mole of epichlorohydrin, and 300 ml. of water was stirred 18 hours at room temperature. A single phase system resulted which was vacuum distilled to a heavy syrup.

A slurry consisting of 2 moles of starch (360 g. at 12 percent moisture), 0.15 mole NaOH, 0.5 mole of NaCl in 460 ml. of water was added to the purified reagent. The slurry was stirred 18 hours at 40° C. The product was filtered and thoroughly washed first with water then with methanol. The product contained 0.11 percent nitrogen, equivalent to a degree of substitution of 0.015.

Example 14

This example illustrates the preparation of a granular starch ether from the epichlorohydrin-tri-n-propylamine reaction product.

A mixture consisting of 0.2 mole of tri-n-propylamine, 0.2 mole of epichlorohydrin and 200 ml. of water was stirred 25 hours at 40° C. Reaction was not complete as shown by the presence of a water imiscible phase consisting of unreacted epichlorohydrin and tri-n-propylamine. This phase was removed and discarded. The aqueous phase was vacuum distilled to a viscous syrup.

A slurry consisting of one-half mole of starch (90 g. at 12 perecent moisture), 0.04 mole NaOH and 0.07 mole of $Na_2SO_4$ was mixed with the purified reagent and the suspension stirred 46 hours at 45° C. The product was filtered and the filter cake thoroughly washed first with water then with methanol. The produce contained 0.27 percent nitrogen, equivalent to a 0.031 D. S. product.

Example 15

One hundred ml. of a 0.1 percent aqueous sol of Hydrasperse brand of coating clay was treated with 0.5 ml.

of a one percent paste of gelatinized cationic starch ether prepared from the trimethylamine-epichlorohydrin reaction product as described in Example 4. The degree of substitution of the cationic starch ether was 0.046. The pH of the suspension was adjusted to 4 with HCl and the solution stirred for 5 minutes. Complete flocculation and settling of the clay occurred within a few minutes leaving a clear supernatant liquid. The amount of cationic starch ether used was 5 percent based on suspended clay.

This application is a continuation-in-part of application Serial No. 554,126, filed December 20, 1955, now abandoned, which is a continuation-in-part of application Serial No. 425,029, filed April 22, 1954, now abandoned.

I claim:

1. A new gelatinizable starch ether in unswollen granule form containing quaternary ammonium nitrogen prepared by etherifying starch under non-gelatinizing conditions in contact with a strongly alkaline catalyst, with the reaction product of epihalohydrin and a compound from the group consisting of tertiary amines and tertiary amine salts; said reaction product being substantially free of unreacted epihalohydrin, the tertiary amine being represented by the formula

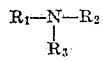

wherein $R_1$, $R_2$ and $R_3$ are radicals containing not more than 18 carbon atoms from the group consisting of alkyl, substituted alkyl, alkene, cyclic formed by joining two R's as previously defined, phenyl and monocyclic aralkyl and when all three R's are the same each is an alkyl group containing not more than 3 carbon atoms, and when all three R's are not the same and any R contains more than 3 carbon atoms, then the other two R's are each an alkyl group not larger than ethyl, and when two R's are joined to form a ring, then the third R is an alkyl group not larger than ethyl.

2. A process for preparing cationic nitrogen containing gelatinizable starch ethers in unswollen granule form which comprises removing substantially all of the unreacted epihalohydrin from the reaction product of epihalohydrin and a compound from the group consisting of tertiary amines and tertiary amine salts, and etherifying starch under non-gelatinizing conditions, in contact with a strongly alkaline catalyst, with the resultant reaction product substantially free of epihalohydrin; the tertiary amine being represented by the formula

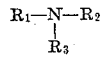

wherein $R_1$, $R_2$ and $R_3$ are radicals containing not more than 18 carbon atoms from the group consisting of alkyl, substituted alkyl, alkene, cyclic formed by joining two R's as previously defined, phenyl and monocyclic aralkyl and when all three R's are the same each is an alkyl group containing not more than 3 carbon atoms, and when all three R's are not the same and any R contains more than 3 carbon atoms, then the other two R's are each an alkyl group not larger than ethyl, and when two R's are joined to form a ring, then the third R is an alkyl group not larger than ethyl.

3. A process according to claim 2 wherein sodium sulfate is present in the reaction medium during the etherification reaction.

4. A process according to claim 2 wherein unreacted epihalohydrin is removed by evaporation.

5. A process according to claim 2 wherein unreacted epihalohydrin is removed by solvent extraction.

6. A process for preparing a gelatinizable cationic starch ether which comprises removing substantially all of the unreacted epihalohydrin from the reaction product of epihalohydrin and triethylamine, and etherifying starch with the resultant reaction product, substantially free of epihalohydrin, in contact with a strongly alkaline catalyst, the etherification being carried out under non-gelatinizing conditions.

7. A process for preparing a gelatinizable cationic starch ether which comprises removing substantially all of the unreacted epichlorohydrin from the reaction product of epichlorohydrin and a tertiary amine wherein two of the groups attached to the nitrogen are methyl, and etherifying starch with the resultant reaction product substantially free of epichlorohydrin, in contact with a strongly alkaline catalyst, the etherification being carried out under non-gelatinizing conditions.

8. A process for preparing a gelatinizable cationic starch ether which comprises removing substantially all of the unreacted epichlorohydrin from the reaction product of epichlorohydrin and trimethylamine, and etherifying starch with the resultant reaction product substantially free of epichlorohydrin, in contact with a strongly alkaline catalyst, the etherification being carried out under non-gelatinizing conditions.

9. A process for preparing a gelatinizable cationic starch ether which comprises removing substantially all of the unreacted epichlorohydrin from the reaction product of epichlorohydrin and dimethyldodecylamine, and etherifying starch with the resultant reaction product substantially free of epichlorohydrin, in contact with a strongly alkaline catalyst, the etherification being carried out under non-gelatinizing conditions.

10. A process for preparing a gelatinizable cationic starch ether which comprises removing substantially all of the unreacted epichlorohydrin from the reaction product of epichlorohydrin and dimethylbenzylamine, and etherifying starch with the resultant reaction product substantially free of epichlorohydrin, in contact with a strongly alkaline catalyst, the etherification being carried out under non-gelatinizing conditions.

11. A process for preparing a gelatinizable cationic starch ether which comprises removing substantially all of the unreacted epibromohydrin from the reaction product of epibromohydrin and triethylamine, and etherifying starch with the resultant reaction product substantially free of epibromohydrin, in contact with a strongly alkaline catalyst, the etherification being carried out under non-gelatinizing conditions.

12. A process for preparing a gelatinizable cationic starch ether which comprises removing substantially all of the unreacted epichlorohydrin from the reaction product of epichlorohydrin and 2-chloro-N, N-dimethylethylamine hydrochloride, and etherifying starch with the resultant reaction product substantially free of epichlorohydrin, in contact with a strongly alkaline catalyst, the etherification being carried out under non-gelatinizing conditions.

References Cited in the file of this patent

UNITED STATES PATENTS

| | | |
|---|---|---|
| 2,054,746 | Granacher | Sept. 15, 1936 |
| 2,116,867 | Kreimeier et al. | May 10, 1938 |
| 2,120,513 | Stahn | June 14, 1938 |
| 2,131,120 | Schlack | Sept. 27, 1938 |
| 2,733,238 | Kerr et al. | Jan. 31, 1956 |
| 2,802,000 | Caldwell | Aug. 6, 1957 |
| 2,813,093 | Caldwell | Nov. 12, 1957 |